United States Patent Office 3,292,525
Patented Dec. 20, 1966

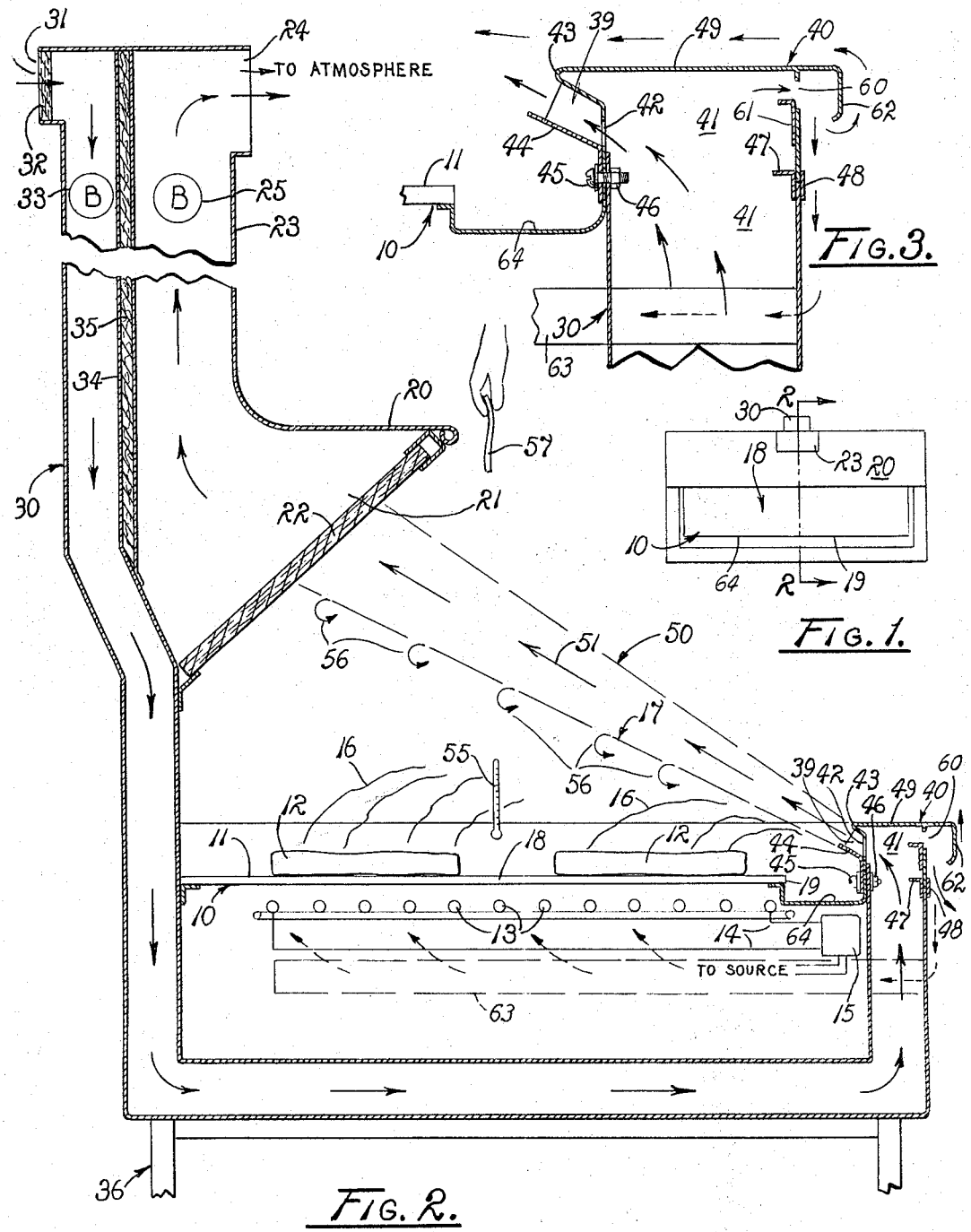

3,292,525
PROTECTIVE AIR CURTAIN FOR COOKING AREA
Donald D. Jensen, 3604 E. Butler,
Fresno, Calif. 93702
Filed Sept. 13, 1965, Ser. No. 489,800
7 Claims. (Cl. 98—115)

This application is a continuation-in-part of application Serial No. 319,728, filed October 29, 1963 and now Patent No. 3,260,189. The present invention relates to a ventilation system adapted to remove objectionable fumes, vapors, smoke and the like emitted from a localized zone, such as cooking ranges, grills or the like. The ventilation system has particular utility in conjunction with a heating unit having a localized heating zone and installed in a closed architectural structure, such as a residence, restaurant, and the like.

It is a conventional practice of ventilating buildings in which localized heating units are located, such ventilating being intended to remove heated air from in and around the heating unit. Ventilation also is employed to remove vapors rising from cooking oils and greases which have been elevated above their vaporization temperature, as well as to remove odors associated with the preparation of food which may be considered objectionable in other parts of a building.

While the present invention has particular utility in conjunction with such heating units used in the preparation of food and is so described herein for the purpose of illustrative convenience, it is to be understood that the invention has utility with other types of devices which have respective localized zones which generate objectionable fumes, such as smoke, vapors, offensive odors or the like. Throughout the specification and claims, the term fumes will be considered to include any airborne substance, regardless of its physical state which may be either liquid, gaseous, or solid. Minute particles of substances may be suspended in the air either in the liquid or solid phase, such as in the case of air saturated with water vapor, or smoke, which is a dispersed system of solid carbon suspended in the air.

Previously known ventilating systems in buildings, such as restaurants, were designed primarily as exhausting systems and depend upon the air within the building to move towards the ventilating systems and serve as a conducting vehicle to carry the fumes to be removed. Most of such exhaust systems employ some form of a canopy or hood supported in a superior position relative to a cooking unit and provide a blower in communication with the hood to create a negative pressure, relative to the remainder of the building, at an exhaust opening defined by the hood.

In ventilating buildings containing large cooking units, it is not uncommon to remove ambient air within the building at rates as high as 5,000 to 10,000 cubic feet per minute. With such high rates of air movement, unpleasant draughts are unavoidably created in the building. Also, the additional heat load to the air conditioning system of such a building represents approximately one-half to two-thirds of the total heat load of the building. By the term "heat-load" is meant that quantity of heat which must be either added to or removed from the air within the building to satisfy contemporary levels of human comfort. During the winter, the heating portion of the air conditioning system would be utilized to supply required heat, and conversely, during the summer months, the refrigerating portion of the air conditioning system would remove excess heat rejected to the ambient air by cooking units and occupants of the building.

In such exhaust systems which are employed to remove air laden with fumes containing an appreciable quantity of vaporized grease, the ambient air serving as the vehicle normally is not at a sufficiently low temperature to effect a condensation of the grease in grease filters or prior to entry into such filters, normally employed in such exhaust systems. Consequently, the vaporized grease escapes through the filter and subsequently condenses on the walls of the conduits in such exhaust systems. This condensed grease on the conduit walls constitutes a major fire hazard, particularly in restaurant buildings.

In addition to generating undesirable fumes and causing fire hazards by condensation of grease vapors, the heating units employed in restaurants frequently cause painful burns to personnel working in and around such units. The possibility of such burns arises by reason of the high temperature of the cooking unit and the material from which such cooking units are constructed, primarily stainless steel, which is considered a good conductor of heat. The previously known exhaust systems have in no way reduced the possibility of such burns.

Accordingly, it is an object of the present invention to provide a ventilation system which removes grease, smoke, and other fumes emitted from a localized heating zone and materially reduces the fire hazard normally attendant exhaust systems employed for such purpose.

Another object is to provide a ventilation system which materially enhances the safety of personnel working in and around such localized heating zones.

Another object of the invention is to provide a ventilation system for closed buildings which effectively removes objectionable fumes from a localized zone therein while reducing total air and heat losses from within the building from that experienced with previously known exhaust ventilation systems.

Another object of the invention is to provide a ventilation system which effectively removes grease from fumes emitting from a localized zone and collects the grease for convenient disposal while minimizing random splattering thereof on surrounding surfaces.

Another object is to provide a ventilation system which removes fumes from one or more localized zones within a building and requires appreciably less air movement than previously known systems and consequently reduces the power requirements for ventilating purposes.

A further object of the invention is to provide a closed circuit ventilation system having an air exhaust means to remove fumes from a localized zone and an air supply means to admit and direct air toward the done, both the exhaust and supply means being in communication with a common sump.

These, together with other objects, will become more fully apparent upon reference to the following description and accompanying drawing.

In the drawing:

FIG. 1 is a scale, top plan view of one form of a ventilation system embodying the principles of the present invention.

FIG. 2 is an enlarged view in vertical, transverse section taken on line 2—2 of FIG. 1.

FIG. 3 is a fragmentary, enlarged view in vertical, transverse section of the system of FIG. 2.

Referring more particularly to FIGS. 1 and 3, a localized heating unit in the form of a grill 10 provides an upwardly presented heating or cooking surface 11. For purposes of illustration of the invention, the grill surface 11 supports articles of food thereon, such as steaks, illustrated at 12. Thermal energy is imparted to the steaks by means of a resistance coil 13 supported below the grill 10 in a position to transfer energy thereto by means of radiation, conduction and/or convection. Other forms of elements and/or substances suitable for supply thermal energy to cook food on the grill 10 will readily occur to those skilled in the art.

A pair of conductors 14 lead to the resistance element 13 from a suitable control element schematically illustrated at 15 and connected to a source of electrical energy, not shown. It is to be understood that various forms of cooking oils, such as solid fats and the like, as well as fats in the food itself, generate fumes, schematically illustrated at 16, and which may be in the form of grease vapors, water vapors, odors, smoke, and the like. The fumes 16 are generated in a localized zone overlying the grill 10 and indicated at 17. The zone 17 includes a central portion 18 defined by marginal edges, one of which is indicated at 19.

An exhaust hood 20 is supported in a superior position relative to the grill 10 and provides an exhaust opening 21 adapted to admit fumes 16 moving from the localized zone 17. A conventional filter 22 is disposed across the exhaust opening and adapted to remove vaporized fats and greases entrained in the air moving from the zone 17. A stack conduit 23 is supported in the building, not shown, and leads from the exhaust opening 21 to a discharge outlet 24 in communication with the atmosphere. A blower 25 is mounted in the stack conduit 23 and driven by any suitable power means, not shown, to motivate air through the exhaust opening and ultimately to discharge it to the atmosphere.

A fresh air supply inlet conduit 30 is supported in the building in close proximity to the exhaust stack conduit 23. The inlet conduit affords an inlet opening 31 in communication with the atmosphere and provided with a filter 32. A blower 33 is mounted internally of the conduit 30 to provide the desired air flow requirements. The inlet conduit 30 includes a wall 34 disposed in close proximity to the stack conduit 23 so as to be in heat exchange relationship therewith. Insulation is removably mounted between the wall 34 and the exhaust stack conduit 23 as a means to permit selective control of the rate of heat exchange therebetween. A support base is fragmentarily illustrated at 36 and adapted to hold the inlet conduit 30 in a desired position relative to the grill 10.

A distributing manifold 40 is mounted in communication with the inlet conduit 30 and affords a distributing chamber 41 leading to a discharge aperture 42. In the form of the invention illustrated, the discharge aperture 42 is an elongated throat disposed immediately adjacent to the marginal edge 19 of the zone 17. Accordingly, the discharge aperture at least partially circumscribes the localized zone 17. A series of spaced baffle plates 39 are mounted in the aperture to direct the air flow therethrough in a substantially perpendicular direction relative to the longitudinal axis of the throat.

A flow directing lip 43 is carried by the manifold 40 and extended along one side of the narrow throat-like aperture 42. The lip 43 cooperates with a volume and direction control plate 44 disposed on the opposite side to effect directional control over air discharged from the aperture 42. The plate 44 is adjustably mounted on the inlet conduit 30 by means of a retaining bolt 45 screw-threadably received in a nut 46 welded to the conduit 30. By appropriate movement of the plate 44 toward and away from the lip 43, as well as bending of the plate 44 at a predetermined desired angle, both the volume and direction of the air passing through the aperture 42 is effectively controlled. As can be seen more clearly in FIG. 2, the manifold 40 is releasably frictionally mounted on the conduit 30 by means of the retaining bolt 45 as well as laterally opposed cooperating flanges 47 and 48. The flange 47 is welded to the conduit 30, while the flange 48 is welded to the manifold 40.

An additional elongated aperture 60 leads from the manifold 40 and is provided with a slidable lip 61 to allow regulation of air flowing therethrough. A flow directing skirt 62 extends along the aperture for directing passage of air downwardly. A passageway 63 may be provided to allow passage of such air into the area of the thermal energy elements 13 if they are of a type requiring oxygen, such as oil burners, not shown.

An elongated grease collection trough 64 is mounted between the discharge aperture 42 and the marginal edge 19 of the cooking range 10. The trough is of a sufficient width to collect grease droplets condensing in the air substantially immediately after discharge from the aperture 42.

OPERATION

The operation of the described embodiment of the subject invention is believed to be readily apparent and is briefly summarized at this point. It is to be assumed that the grill 10 and the ventilation system of the present invention are installed in a substantially closed building, such as a contemporary restaurant. During the cooking of articles of food, such as the steaks on the surface 11, the blowers 25 and 33 are motivated to provide a positive pressure in the inlet conduit 30. Consequently, a moving stream of air, schematically indicated at 50, is directed toward the exhaust opening 21 of the hood 20. The stream of air 50 is discharged from the elongated aperture 42 as a protective blanket or curtain overlying the grill 10 and the localized zone 17 from which the fumes 16 emanate. The stream of air 50 has a central core moving in the direction of the arrows 51 toward the approximate central portion of the inlet opening 21.

With the blowers 25 and 33 in operation, a thermometer 55 has been supported in the position shown in FIG. 2 adjacent to the cooking surface 11 and within the localized zone 17. With such a thermometer, it has been observed that thermal losses from the grill 10 by convection currents are appreciably reduced. This reduction of convective thermal losses was noted in the temperature readings with the ventilation system in operation being higher than the temperature reading observed when the blowers 25 and 33 were inoperative. Both temperature readings were taken at the same temperature setting of the control 15 of the resistance element 13.

The stream of moving air 50 serves as a protective blanket overlying the zone 17 and prevents the free passage of the fumes 16 away from the grill 10 and into the ambient air in the building, which normally would occur by convective air movements.

The high velocity of the moving air 50 relative to the air and fumes 16 overlying the cooking zone 17 results in the air stream 50 forming a low pressure area causing the fumes to be sucked into the stream. The air velocity is at its highest immediately after leaving the aperture 42 and, therefore, the low pressure and resultant suction is greatest directly above the grease trough 64. Consequently, fumes emanating from the cooking zone tend to be drawn into the air stream in the front of the grill 11 or above the trough.

Due to the friction between the moving air stream 50 and the convective currents within the zone 17, small eddy currents 56 of the fumes are formed at the upper portion of the zone 17. Due to the intermixing and suction of the air in the zone 17 into the stream 50, the fumes are picked up by the air stream 50 and are either dropped out as a heavier condensate or are carried toward the exhaust opening 21.

It is to be observed that the inlet conduit 30 provides a supply of air from outside the building at ambient temperatures and directed toward the distributing manifold 40. Consequently, the manifold is maintained at approximately outside ambient temperatures so that the surface 49 is well below a temperature considered dangerous to personnel in and around the grill 10. In actual practice, the surface 49 is quite cool when measured by the human sense of touch.

In addition to cooling the manifold 40, the stream of relatively cool air 50 reduces the temperature of the fumes 16 entrained therein and serves as a vehicle to carry the fumes through the filter 22. Since the outside ambient air temperature is well below the condensation temperature of the fats entrained in such fumes, most of the fumes reach condensation temperature before contact with the filter 22. Due to the tendency of a substantial amount of the fumes 16 to be sucked into the stream 50 above the trough 64, heavier particles of grease are caused to condense and to fall into the trough, thus preventing the splattering of heavier droplets of grease on the surrounding surfaces of the cooking range during subsequent passage of the air stream. Upon contact with the filter 22, the filter is effective in removing the major remaining portion of condensed grease and fats. Consequently, subsequent condensation in the stack conduit 23 is precluded which greatly reduces the fire hazard normally attendant previously known ventilation systems for restaurant grills.

As a further illustration of the effectiveness of the air stream 50 in preventing the escape of the fumes 16 from the zone 17, a small streamer 57, in the form of a narrow ribbon of tissue paper, was suspended immediately above the air stream 50 in close proximity to the exhaust opening 21. With both blowers 25 and 33 in operation, and while cooking food on the grill 10, the streamer 57 remains substantially motionless indicating the effectiveness of the flow directing lip 43 and the control plate 44 in confining the air stream 50 and directing it toward the exhaust opening 21. The stability of the streamer 57 when in the position as shown in FIG. 2, also indicates that the ventilation system of the present invention was capable of supplying the total requirements of air from the atmosphere for ventilation purposes and removing substantially the same quantity of air by the exhaust blower 25. By so balancing inlet and exhaust requirements, loss of air from within the building is prevented. In addition, heat load losses are appreciably reduced. In a commercial form of the present invention, it has been observed that the heat load on a restaurant building housing the system has been reduced by approximately two-thirds. This two-thirds reduction has been experienced with both the heating and refrigerating portions of the air conditioning system of the building. Although the exhausted air is discharged to the atmosphere and the inlet air is also supplied therefrom, the atmosphere is of a sufficient capacity as a common sump so that the temperature of the inlet air remains substantially uniform. Accordingly, the inlet air effectively cools the surface 49 of the manifold 40 below an uncomfortable level which would otherwise exist and possibly burn personnel. The inlet air also maintains the air stream 50 at a low temperature sufficient to cool the fumes 16 to effect condensation of vaporized fat therein as the fumes pass through the filter 22.

In the event it is desired to supply air to selected areas away from the high-velocity air stream 50, such as the ambient air in front of the zone 17 or the thermal energy supply zone, the lip 61 is adjusted to open the additional aperture 60. The relatively cooler air then flows downwardly for passage through the passageway 63. It would also be possible to direct such make-up air upwardly to take the place of any small quantities of ambient air drawn into the air stream.

Accordingly, the present invention provides a ventilation system which effectively confines fumes emitting from a localized zone and removes the fumes as they emit from the zone. The relationship of the air inlet supply means and the air exhaust means is such that the system is substantially self-sufficient, insofar as air supply is concerned. Consequently, the ambient air within the building in which the system is installed is not used as the exhaust vehicle for fumes generated in the localized zone. Accordingly, air losses, as well as total heat load, are reduced in the building. Other directly related benefits of the system are the material reduction of fire hazard in the exhaust stack conduits of the exhaust hood, the removal and collection of heavier grease particles without splattering surrounding surfaces, and the maintaining of the temperature of structure surrounding a localized heating zone at a level well below that considered dangerous to humans. Consequently, the invention enhances the safety of persons in and around such a heating unit, while effectively removing heat and fumes generating therefrom.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A system for removing air-borne contaminants including the products of combustion and volatilization incident to cooking from a cooking area located in an air-conditioned room with a minimum of disturbance or displacement of the conditioned air by such removal comprising
   (a) air supply means including a first blower means having an intake externally of said room for directing a confined air stream to the cooking area,
   (b) an air discharge connected to the supply means at the cooking area for discharging the air stream into the room adjacent to the cooking area in a curtain projected over the cooking area to pick up said contaminants and to shield the conditioned air of the room therefrom, and
   (c) air exhaust means, separate from said supply means and including a second blower means having an air receiving inlet disposed adjacent to the cooking area in alignment with the discharge to receive the curtain of air and contaminants picked up thereby and an exhaust outlet externally of the room and separate from said intake for release of the air stream and said contaminants,
      (1) the air supply means and the air exhaust means being substantially volumetrically balanced so that the volume of air supplied in said air stream to the room substantially equals the volume of air and contaminants removed in said air stream from the room.

2. A system as defined in claim 1 wherein said cooking area comprises a heated surface having an edge adjacent but spaced from said air discharge, and a collector trough extending along said edge and between said edge and said air discharge.

3. A system as defined in claim 1 wherein said air discharge comprises an elongated manifold having a continuous elongated air discharge slot extending therealong to discharge a continuous curtain of air.

4. A system as defined in claim 3 including adjustable means for varying the width of said slot.

5. A system as defined in claim 1 wherein said air discharge comprises an elongated manifold, adjustable outlet means in said manifold for directing a minor portion of said air stream in a direction away from said cooking area.

6. A system as defined in claim 5 wherein said cooking area is heated by a gas burner therebelow; and means for directing said minor portion of said air stream toward said burner to supply combustion air thereto.

7. A system as defined in claim 1 wherein said air supply means and said air exhaust means include respectively adjacent ducts, and heat insulating means removably positioned between said ducts whereby it may be removed therefrom to place said ducts in substantial heat transfer relationship.

References Cited by the Examiner
UNITED STATES PATENTS
2,874,627   2/1959   Simmonds _____ 98—115 X
3,131,687   5/1964   Kalla _____ 98—115

FOREIGN PATENTS
1,109,342   6/1961   Germany.

ROBERT A. O'LEARY, *Primary Examiner.*
JOHN F. O'CONNOR, *Examiner.*
M. A. ANTONAKAS, *Assistant Examiner.*